R. WAPSHARE.
PUNCTURE PROOF PNEUMATIC TIRE.
APPLICATION FILED JULY 8, 1914.

1,220,914.  Patented Mar. 27, 1917.

Witnesses—
Stanley Wood
Robert Owen Hughes.

Inventor
Richard Wapshare
by
Attorney.

UNITED STATES PATENT OFFICE.

RICHARD WAPSHARE, OF WESTWARD HO, BANGALUR, BRITISH INDIA.

PUNCTURE-PROOF PNEUMATIC TIRE.

1,220,914. Specification of Letters Patent. Patented Mar. 27, 1917.

Application filed July 8, 1914. Serial No. 849,828.

*To all whom it may concern:*

Be it known that I, RICHARD WAPSHARE, a subject of the King of Great Britain and Ireland, residing at Westward Ho, Bangalur, British India, have invented certain new and useful Improvements in Puncture-Proof Pneumatic Tires, of which the following is a specification.

This invention relates to pneumatic tires for wheels of vehicles, particularly motor cars and motor cycles, and has for its object to provide means for preventing the puncturing of such tires without greatly increasing their weight or impairing their resiliency.

According to this invention a pneumatic tire is provided with a protective sheath consisting of a plurality of plates of glass, porcelain, earthenware, or other vitreous substance, papier mâché, fiber or the like, each of said plates having two of its edges convex and two concave, the convex edges of one plate being adapted to seat in the concave edges of other plates, and the sheath as a whole being interposed between the layers of fabric in the tread of the tire, or secured to a band of fabric and interposed between the air tube and the covering of the tire.

Figure 1:
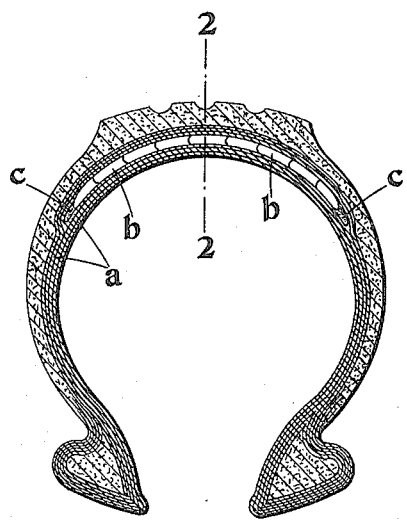
Figure 2:
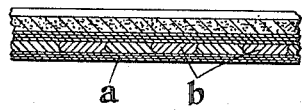

Referring to the accompanying drawings, Figure 1 is a transverse section of one form of tire made in accordance with this invention; Fig. 2 is a cross-section on the line 2—2, Fig. 1; and Fig. 3 is a face view of a modified form of plate.

Interposed between the layers of fabric $a$ in the tread of the tire shown in Figs. 1 and 2 is a protective sheath consisting of a plurality of plates of glass $b$ each of which has two edges concave and two convex, the convex edges of one plate being adapted to seat in the concave edges of the adjacent plates as clearly shown in Figs. 1 and 2. Those plates $b$ which lie at the edges of the protective sheath are beveled at their outer edges and said edges preferably butt against annular rubber pads $c$, $c$.

The plates $b$ may be freely arranged in the outer cover of the tire as shown in Figs. 1 and 2, or some or all of them may be perforated and sewn to a band of fabric in order to facilitate the arrangement of the sheath during the manufacture of the tire.

Figure 3:
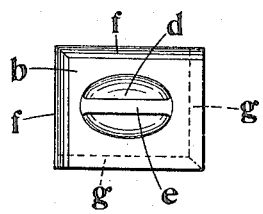

In Fig. 3 is shown, on an enlarged scale, a modified form of plate which is formed with a recess $d$ and cross-piece $e$ around which may be passed the thread or like material by which the plates are attached to a foundation. In Fig. 3 the convex edges $f$, $f$ and the concave edges $g$, $g$ are shown.

Owing to the fact that glass is a poor conductor of heat the cover of the tire is not liable to damage due to heat set up by friction, and owing to the formation of the protective sheath, the resiliency of the tire is not impaired while it is rendered unpuncturable.

What I claim as my invention and desire to secure by Letters Patent is:—

1. A pneumatic tire protector provided with a protecting sheath comprising a plurality of plates so disposed that more than two edges of one plate abut against the edges of the adjacent plates, the adjacent edges of two contiguous plates being formed throughout their length the one concave the other convex in a plane perpendicular to the faces of the plate.

2. A pneumatic tire protector provided with a protecting sheath comprising a plurality of plates so disposed that more than two edges of one plate abut against the edges of the adjacent plates, the adjacent edges of two contiguous plates being formed throughout their length the one concave the other convex in a plane perpendicular to the faces of the plate and each plate having two concave and two convex edges.

3. A pneumatic tire protector provided with a protecting sheath comprising a plurality of plates so disposed that more than two edges of one plate abut against the edges of the adjacent plates, the adjacent edges of two contiguous plates being formed throughout their length the one concave the other convex in a plane perpendicular to the faces of the plate, and a foundation to which said plates are secured.

In testimony whereof I have hereunto signed my name to this specification in the presence of two subscribing witnesses.

RICHARD WAPSHARE.

Witnesses:
P. MICHAEL THAMBUSAWMY,
H. F. BALARAME.

Copies of this patent may be obtained for five cents each, by addressing the "Commissioner of Patents, Washington, D. C."